US008209248B2

(12) United States Patent
Dubinsky (10) Patent No.: US 8,209,248 B2
(45) Date of Patent: Jun. 26, 2012

(54) METHOD AND SYSTEM FOR BUILDING AUDIT RULE SETS FOR ELECTRONIC AUDITING OF DOCUMENTS

(75) Inventor: Andrew M. Dubinsky, Houston, TX (US)

(73) Assignee: Encomia, L.P., Houston, TX (US)

( * ) Notice: Subject to any disclaimer, the term of this patent is extended or adjusted under 35 U.S.C. 154(b) by 779 days.

(21) Appl. No.: 11/235,590

(22) Filed: Sep. 26, 2005

(65) Prior Publication Data

US 2006/0080599 A1    Apr. 13, 2006

Related U.S. Application Data

(60) Provisional application No. 60/612,699, filed on Sep. 24, 2004.

(51) Int. Cl.
*G06Q 99/00* (2006.01)
(52) U.S. Cl. .......... 705/35; 707/694; 715/235; 715/236
(58) Field of Classification Search ........................ None
See application file for complete search history.

(56) References Cited

U.S. PATENT DOCUMENTS

| | | | | |
|---|---|---|---|---|
| 5,617,533 | A | * | 4/1997 | Wu et al. ...................... 714/38.1 |
| 5,629,846 | A | * | 5/1997 | Crapo ............................. 708/705 |
| 5,687,385 | A | * | 11/1997 | Janay ............................. 715/205 |
| 6,006,242 | A | * | 12/1999 | Poole et al. ..................... 715/209 |
| 6,021,202 | A | * | 2/2000 | Anderson et al. ................ 705/54 |
| 6,065,026 | A | * | 5/2000 | Cornelia et al. ............... 715/202 |
| 6,154,753 | A | | 11/2000 | McFarland |
| 6,185,683 | B1 | * | 2/2001 | Ginter et al. ................... 713/176 |
| 6,192,347 | B1 | * | 2/2001 | Graff ........................... 705/36 R |
| 6,195,095 | B1 | * | 2/2001 | Beer et al. ...................... 715/839 |
| 6,209,004 | B1 | * | 3/2001 | Taylor ............................. 715/236 |
| 6,253,193 | B1 | * | 6/2001 | Ginter et al. ..................... 705/57 |
| 6,292,830 | B1 | * | 9/2001 | Taylor et al. ................... 709/224 |
| 6,363,488 | B1 | * | 3/2002 | Ginter et al. ....................... 726/1 |
| 6,389,402 | B1 | * | 5/2002 | Ginter et al. ..................... 705/51 |
| 6,427,140 | B1 | * | 7/2002 | Ginter et al. ..................... 705/80 |
| 6,941,472 | B2 | * | 9/2005 | Moriconi et al. ................ 726/11 |
| 7,065,767 | B2 | * | 6/2006 | Kambhammettu et al. .. 719/310 |
| 7,240,841 | B2 | * | 7/2007 | Kelley et al. ............. 235/462.01 |
| 7,299,408 | B1 | * | 11/2007 | Daconta et al. ................ 715/234 |
| 7,314,168 | B1 | * | 1/2008 | Gorres et al. .................. 235/380 |
| 7,536,456 | B2 | * | 5/2009 | Williams et al. ............... 709/224 |
| 7,555,645 | B2 | * | 6/2009 | Vissapragada ................. 713/166 |
| 7,583,861 | B2 | * | 9/2009 | Hanna et al. ................... 382/305 |
| 7,593,942 | B2 | * | 9/2009 | Sack et al. .............................. 1/1 |
| 7,752,124 | B2 | * | 7/2010 | Green et al. ...................... 705/38 |
| 7,783,564 | B2 | * | 8/2010 | Mullen et al. .................... 705/38 |

(Continued)

OTHER PUBLICATIONS

International Search Report and the Written Opinion of the International Searching Authority issued for PCT/US2005/34699, dated Jan. 25, 2007.

(Continued)

*Primary Examiner* — Farhan Syed
(74) *Attorney, Agent, or Firm* — Craig J. Cox; Bell Nunnally & Martin LLP (57) ABSTRACT

A software-based method and system is described for building audit rule sets for auditing electronic documents. The method and system include an editor, schemas, a processing engine, and documents or a document creation engine. The system and method give users a visual interface for building audit rule sets to examine electronic documents for compliance with legal and regulatory requirements.

19 Claims, 7 Drawing Sheets

U.S. PATENT DOCUMENTS

| | | | |
|---|---|---|---|
| 7,831,567 B2 * | 11/2010 | Luther et al. | 707/663 |
| 7,953,688 B2 * | 5/2011 | Sadeh | 706/47 |
| 8,005,877 B2 * | 8/2011 | McDonald | 707/805 |
| 8,037,004 B2 * | 10/2011 | Rajkumar et al. | 706/47 |
| 8,060,504 B2 * | 11/2011 | Roegner | 707/728 |
| 2001/0018739 A1 | 8/2001 | Anderson et al. | |
| 2002/0107875 A1 * | 8/2002 | Seliger et al. | 707/200 |
| 2002/0128890 A1 * | 9/2002 | Dick et al. | 705/8 |
| 2002/0194026 A1 * | 12/2002 | Klein et al. | 705/2 |
| 2003/0177071 A1 * | 9/2003 | Treese et al. | 705/26 |
| 2003/0229581 A1 * | 12/2003 | Green et al. | 705/38 |
| 2004/0039809 A1 * | 2/2004 | Ranous et al. | 709/223 |
| 2004/0068690 A1 | 4/2004 | Wood | |
| 2004/0085357 A1 | 5/2004 | Childress et al. | |
| 2004/0111639 A1 * | 6/2004 | Schwartz et al. | 713/201 |
| 2004/0133876 A1 * | 7/2004 | Sproule | 717/105 |
| 2004/0177326 A1 * | 9/2004 | Bibko et al. | 715/530 |
| 2004/0216039 A1 * | 10/2004 | Lane et al. | 715/511 |
| 2004/0225632 A1 * | 11/2004 | Benson et al. | 707/1 |
| 2004/0267595 A1 * | 12/2004 | Woodings et al. | 705/9 |
| 2005/0010819 A1 * | 1/2005 | Williams et al. | 713/201 |
| 2005/0177389 A1 * | 8/2005 | Rakowicz et al. | 705/1 |
| 2005/0210046 A1 * | 9/2005 | Brunecky | 707/100 |
| 2006/0053172 A1 * | 3/2006 | Gardner et al. | 707/203 |
| 2006/0080599 A1 * | 4/2006 | Dubinsky | 715/513 |
| 2006/0085469 A1 * | 4/2006 | Pfeiffer et al. | 707/102 |
| 2006/0101027 A1 * | 5/2006 | Hotchkiss | 707/100 |
| 2007/0226695 A1 * | 9/2007 | Krishnaprasad et al. | 717/126 |
| 2008/0306894 A1 * | 12/2008 | Rajkumar et al. | 706/47 |
| 2009/0076841 A1 * | 3/2009 | Baker et al. | 705/2 |
| 2010/0138457 A1 * | 6/2010 | McDonald | 707/805 |
| 2010/0205020 A1 * | 8/2010 | Losey | 705/7 |
| 2010/0275183 A1 * | 10/2010 | Panicker et al. | 717/113 |
| 2010/0332428 A1 * | 12/2010 | McHenry et al. | 706/12 |

OTHER PUBLICATIONS

Supplementary European Search Report issued for European Application No. 05807530 dated Nov. 18, 2009, 3 pgs.

Vince Wilk, "WinDraft—Document Drafting Software for Windows", World Progress Newsletter, 1998, Retrieved from Internet URL http://www.lawtech.com/Articles/abawdtxt.html, dated Nov. 13, 2009, 6 pgs.

Author Unknown, "Curo Systems, Rule 1: a prescribed guide for conduct or action", Retrieved from Internet URL: http://web.archive.org/web/20040906150520/http://curosystems.com/curo/website/rules.htm, dated Sep. 6, 2004, retrieved on Nov. 16, 2009, 3 pgs.

* cited by examiner

MULTISTATE FIXED eNOTE- Single Family - Fannie Mae UNIFORM INSTRUMENT     Form 3200e4/02

NOTE

Exec. Month | Day | , Year

Execution city | , Execution state

Property Street | , Property City | , Property State | Postal code

1. BORROWER'S PROMISE TO PAY

In return for a loan that I have received, I promise to pay U.S. $ | Loan amount | (this amount is called "Principal"), plus interest, to the order of the Lender. The Lender is | Lender name |.

I will make all payments under this Note in the form of cash, check or money order.

I understand that the Lender may transfer this Note. The Lender or anyone who takes this Note by transfer and who is entitled to receive payments under this Note is called the "Note Holder."

2. INTEREST

Interest will be charged on unpaid principal until the full amount of Principal has been paid. I will pay interest at a yearly rate of | Interest rate |%.

The interest rate required by this Section 2 is the rate I will pay both before and after any default described in Section 6 (B) of the Note.

METHOD AND SYSTEM FOR BUILDING AUDIT RULE SETS FOR ELECTRONIC AUDITING OF DOCUMENTS

CROSS-REFERENCE TO RELATED APPLICATIONS

This application claims priority to U.S. Provisional Application No. 60/612,699, filed Sep. 24, 2004, which is incorporated by references herein in its entirety.

TECHNICAL FIELD

The concepts described herein relate generally to user interfaces in computer systems and more particularly to the use of extensible markup language to determine and describe allowable and forbidden validation of data contained within a legal document describing regulatory structure as evinced by legal text.

BACKGROUND OF THE INVENTION

When legislators and government entities draft statutes to regulate commerce, a certain type of legal language is employed to describe the various entities, their relationships, and constraints on behavior of said entities. These drafters often use limiting language and purposeful descriptions to specify the method to which laws, rules, and regulations must be obeyed. Entities affected by these regulations must comply using various means, including the use of computer processing systems to analyze information and determine with simplistic Boolean algebra if the presented information falls within the regulatory guidelines. These tests are authored by computer programmers using a multitude of computer languages on systems of varying size and complexity. All these systems have commonalties, including a limitation that the executable language is transmitted in whole apart from the data it contains. The data may be part (a resource) of the underlying executable program.

By using a compound document type based on XML, or eXtensible Markup Language and a description of the Boolean logic, a document can be created that contains all needed components for validating and processing a particular information sets' compliance with regulatory information directly relevant to the aforementioned document. This compound document contains sections that describe meta-information about the document, data in the form of discrete values, legal terminology, and legal conditions. The complexity of developing such a system involves the production of legal terms and conditions capable of satisfying the demanding exactitude of computer processing systems while maintaining human readability of legal terminology. This legal terminology must be proved exactly and faithfully represented by the computer system in order to substantiate the human-readable legal text. The legal text binds the actions of the parties to a particular course or courses of action and represents a meeting of the minds. Computer systems must be able to elucidate the intent of those minds and discern from those legal terms an exact and uncompromising Boolean argument capable of providing two determinate outcomes, true or false. In the event that the computer system cannot discern proper logic structure capable of resolving a binary condition, the resulting indeterminate argument must also be provided. However, indeterminate results are not of themselves proper results from a Boolean condition and represent only an erroneous or unexpected condition.

What is needed is a method for providing computer processing systems a mechanism for elucidating and validating regulatory statutes and legal constraints.

BRIEF SUMMARY OF THE INVENTION

The concepts described herein are directed to a system and method which allow a user to create legal documents having both static text and variable source data specific to an individual transaction and to audit those documents for compliance with legal rules and regulations as well as provider specific requirements. The documents are audited using one or more audit rule-sets which are created from preconfigured rules which can be used to create a rule-set by populating the rule-set with the preconfigured rules and creating relationships between the rules.

In one embodiment a method for creating documents and testing the documents compliance with applicable rules is described which includes populating a document with source data, creating an audit rule-set using preconfigured audit rules and testing the document using the audit-rule set to determine if the document complies with the applicable rules.

In another embodiment a system for creating documents with static and variable data, and testing the documents for compliance with applicable rules is described. The system includes a rule pane holding one or more preconfigured rules usable in auditing the document, a rule-set editor allowing a user to assemble audit rule-sets from the rules in the rule pane, and a properties pane that includes descriptions of each rule in the rules pane. The rule-set editor is additionally operable to allow a user to define relationships between the rules in the rule-set.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

The concepts described herein relate to a software program running on a computer, where the software program is operable to construct audit rules and rule-sets, using a visually-oriented interface that shows how audit rules and rule-sets will look in a hierarchical arrangement. The program is further operable to set custom properties and definitions for individual audit rules, allowing for maximum flexibility in document evaluation, and allow integration with secondary application(s) to evaluate documents for legal and regulatory compliance.

To better understand the concepts described an the embodiments of the program discussed it may be helpful to have an understanding of some of the terms used herein. The term "audit" is intended to describe a method of evaluating any unique data. Very much like a corporation's financial data are "audited" to ensure that financial reporting is correct, a single document or collection of documents of any type can also be "audited" for compliance with legal or regulatory expectations or compliance. Specific to the mortgage industry, mortgage documents are audited regularly for various reasons, including lender compliance, data mining, trend-reporting, compliance with federal, state, and local laws, pooling of loans with similar characteristics for sale to investors, and various other needs.

An "audit rule" can be a specific instructional or conditional parameter based on regulatory or legal requirements that evaluates the document for compliance based on a pass/fail condition. An "audit rule set" is then a collection of various rules and testing parameters gathered together as a coherent and unified set of rules against which a document is tested for regulatory compliance.

"Electronic document" or just "document" is meant to refer to the electronic representation of a document as a "file" by a computer system (e.g. a Microsoft Word "file" is a document file, because it represents a textual file in electronic format), vs. a printed document.

Extensible Markup Language, or "XML", is a derivative of hypertext markup language (HTML), a unique programming language used primarily in the World Wide Web environment to represent "web pages." Unlike HTML, which is relatively simple and constrained, XML is a highly sophisticated and flexible programming language used primarily to build World Wide Web-based software applications that run primarily in World Wide Web browsers.

A Logical Data Dictionary, or "LDD", is a compilation Of methods, classes, objects, and various other code-based constructs used in a software application. An LDD generally defines the methods, classes, objects, and code-based constructs used in the software application and explains how they are used. Mortgage Industry Standards and Maintenance Organization, or "MISMO" is a standards body organized by the Mortgage Bankers Association ("MBA") to establish, and ultimately enforce, standards for electronic mortgages.

MISMO has developed an LDD of code-based objects and a code-based hierarchy for populating SMARTDocs with variable source data. More information on this LDD can be found at www.mismo.org, the contents of which are hereby incorporated by reference.

A Software Developer's Kit, or "SDK" is a code-based package of tools, methods, classes, and objects provided with a software application that makes it possible for a customer to develop custom software extensions or tools. An SDK is generally licensed with the sold software application. A SMARTDoc is a type of electronic document which can utilize XML-based constructs to define "layers" that are used to separate static, unchangeable text from variable document-specific data. WYSIWYG, or "What You See Is What You Get." refers to a type of editor that is common throughout industry and lauded for their ease-of-use and their method of helping the user build documents with a visual interface that allows users to see what their end-document(s) will look like while the documents are being constructed. Examples of WYSIWYG editors include Microsoft Word, Microsoft PowerPoint, and others.

"XPATH" is an XML-specific construct that defines where variable objects may be placed in an XML-based SMARTDoc. It requires use of an LDD to define XPATHs and ensure that data objects can be properly matched with their corresponding XPATHs.

The operation of the embodiment of the program described herein will be described according to a process flow that follows a user's perspective and provides insight into how the embodiment of the program could be used and/or implemented in a business environment.

Audit Rule Set Construction with the Audit Flow Editor

A user using the embodiment of the program, which is operable to examine documents for compliance with legal and regulatory requirements, might first construct the audit rule set that can be used to evaluate the SMARTDoc for compliance. Audit rule construction can be done using a tool referred to as the Audit Flow Editor, a proprietary custom software application whose purpose is to construct audit rule-sets.

In a hypothetical scenario, a user (e.g. a loan processing clerk in a mortgage organization) would set up the audit rule sets using the following criteria and priorities: (1) bank/mortgage organization business rules; (2) bank/mortgage organization processing & approval rules; (3) legal requirements specific to the state in which the mortgage is being processed.

Figure 1:
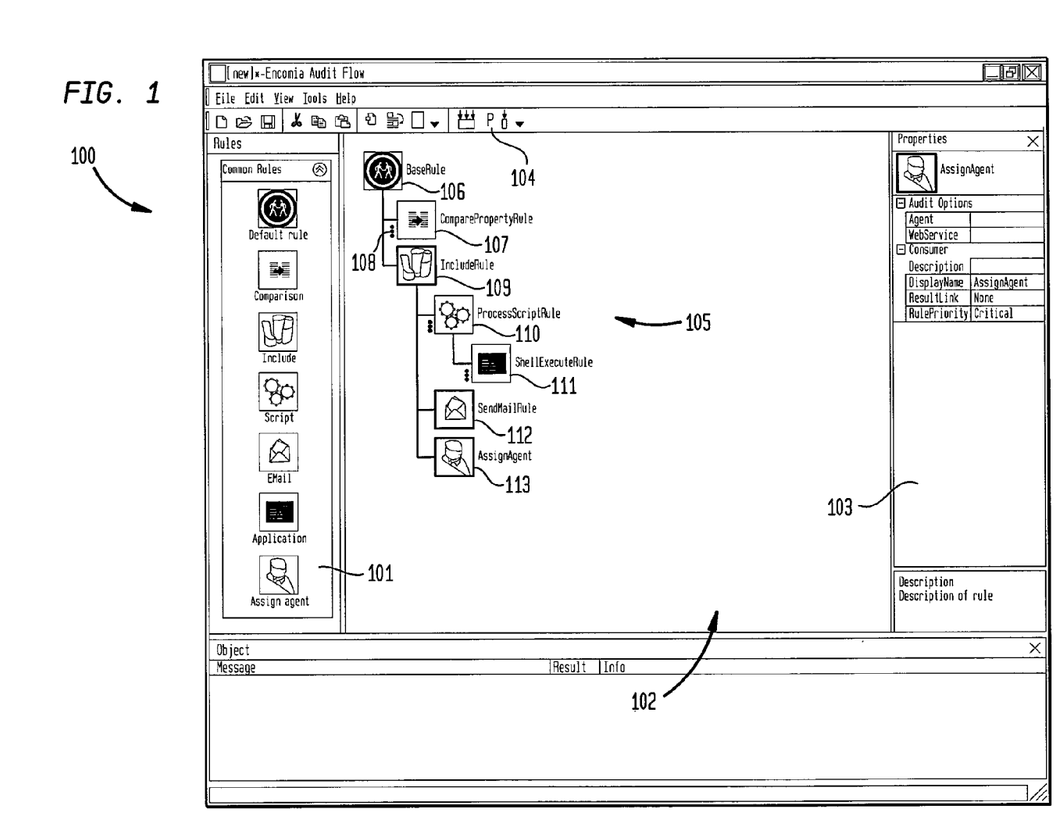
FIG. 1 is a representation of a program interface of an embodiment of a software program according to the concepts described herein.

The user would launch the Audit Flow Editor, and would see a program interface, which could, for example, be the program interface 100 shown in FIG. 1. The program interface 100 can be used to display the application in a standard Microsoft Windows tri-pane format, with a Common Rules pane 101, shown in FIG. 1 on the left, and/or an Editor pane 102, shown in FIG. 1 in the center, and/or a Properties pane 103, shown on the right. In a Microsoft Windows environment, standard menu and toolbars 104 can appear at the top of the application window.

The user would begin building the audit rule set by dragging a common rule from the Rules pane into the editor pane. The Rules pane 101, shown in greater detail in FIG. 2, contains pre-formatted common rules 201-207 used in audit rule construction as basic templates on which to build a complex rule-set.

Figure 2:
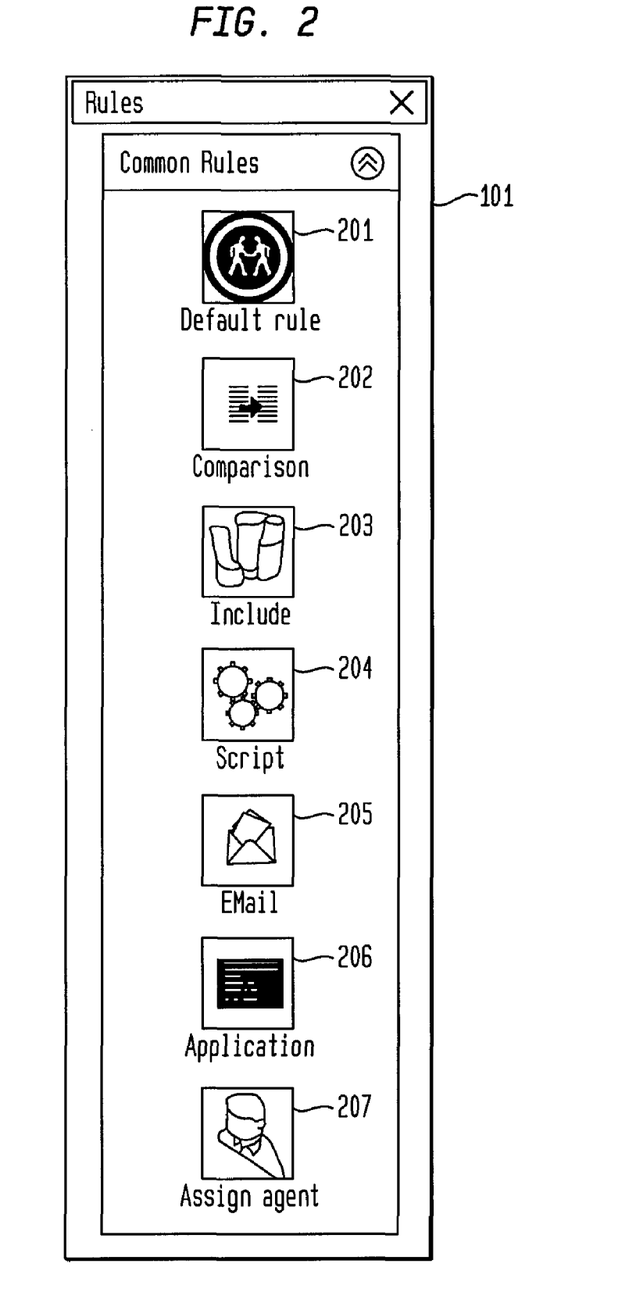
FIG. 2 is a representation of the common rules pane from the program interface of FIG. 1.

With reference to the embodiment of the common rules 201-207 shown in FIG. 2, the Common Rules are provided in "default" mode with basic structure and few specific properties set so that the user can define rule properties as needed.

The Default rule, or base rule is an empty rule container that can be configured and named as needed. It is a general rule with no specific properties. The Comparison rule 202 can be used to compare two or more conditions or specific properties in the document on a pass/fail basis. The Include rule 203 can be used to specify inclusion of an external rule-set or file during rule-processing. The Script rule 204 can be used to specify inclusion of an external script during rule-processing. The Email rule 205 can be used to specify that notification emails be sent to any number of recipients during or after rule-processing. This rule could be used to notify persons that rule-processing has passed or failed, and could be used to notify persons elsewhere in the mortgage process that the subject document has been audited for compliance.

The Application rule 206 can be used to specify processing of an external application during rule-processing. The Assign Agent rule 207 can be used to assign a specific individual to the mortgage application and rule-processing event. Assignment takes place during rule-processing, and this rule would be most commonly used with the EMail rule to notify the individual of their assignment.

Figure 3:
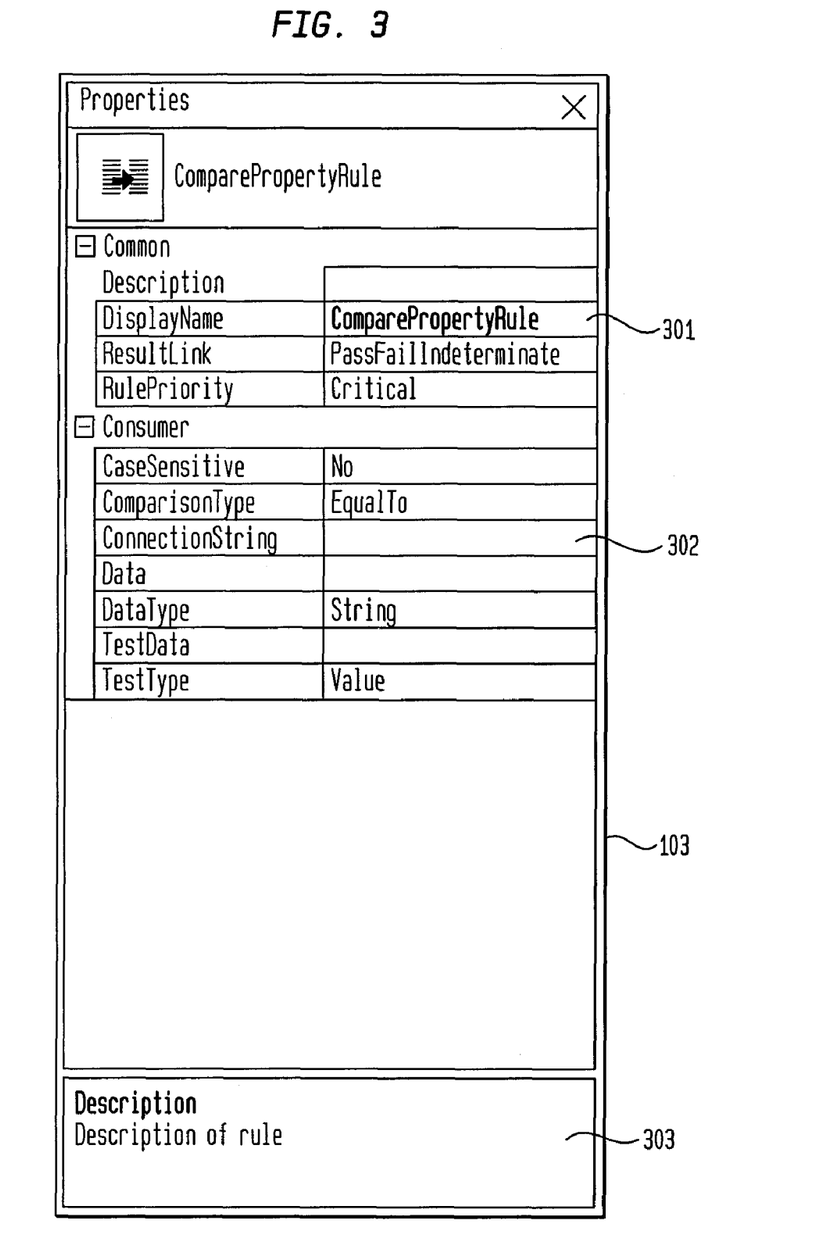
FIG. 3 is a representation of the properties pane from the program interface of FIG. 1.

Referring again to FIG. 1, as the user drags the first rule from the Rules pane to the Editor pane, the Audit rule-set 105 begins to take shape. The Properties pane 103 on the right shown in greater detail in FIG. 3, shows rule-specific properties for a selected rule, which can be displayed and changed as needed to suit the specific business and legal environment. The Properties pane 103 includes areas for common attributes 301 and optional attributes 302, as well as a space for a written description 303 of the selected rule.

As shown in FIG. 1, the embodiment of the program described allows the user to "drag-n-drop" rules from the Rules pane 101 to the Editor pane 102, where the rule-set 105 is constructed in a visual environment that clearly shows the relationships between individual rule elements, including processing order.

FIG. 1 illustrates a representative example of an audit rule construction process, which shows the visually-oriented drag-and-drop audit rule construction process. Audit rule objects 201-207 from FIG. 2 are dragged-and-dropped into the audit rule editing pane 102, where the rules are "assembled" visually, prepared, and tested prior to use. FIG. 1 is merely illustrative of the operation of the described embodiment of the program, and is not intended to be limiting to the scope of the concepts described herein. One of ordinary skill in the art would recognize many other variations, alternatives, and modifications.

In FIG. 1, base rule 106 has been dragged into the Editor pane 102. This base rule serves as the "top-level" of the rule-set, and is the predecessor for all subsequent sub-rules in the rule-set. BaseRule 106 is a generic container rule that can be defined in a very broad sense as a top-level container rule for subsequent sub-rules.

Rules are processed in sequential order beginning with the base rule, followed by sub-rules. The first sub-rule, ComparePropertyRule 107, has been dragged into the Editor pane 102 and added as a "child" of base rule 106. The symbols 108 next to the sub-rule icon indicate the designated and desired result (s) of the sub-rule processing, color coding of symbols 108 can be used to accomplish this feature. Designated and desired results include None, Pass, Fail, PassFail, Indeterminate, PassIndeterminate, FailIndeterminate, and PassFailIndeterminate.

ComparePropertyRule 107 can be used to compare two or more properties or objects in a SMARTDoc for agreement. The ComparePropertyRule 107 would generally be used in a Boolean comparison operation, yielding a Pass/Fail or Yes/No result.

A second sub-rule, IncludeRule 109, has been added at the same level as the first sub-rule, ComparePropertyRule 107. Because rules are processed sequentially, this rule will be the next rule processed unless sub-rules are added to ComparePropertyRule 107. IncludeRule 109 is used to specify inclusion of third-party source data or other exterior data file, etc. during rule-set processing.

Sub-rule ProcessScriptRule 110 has been added to IncludeRule 109. ProcessScriptRule 110 can be used to embed processing of an exterior script in the rule-set. An example of script embedding might include the processing of an exterior JavaScript to "clean up" unpopulated or unneeded data objects in the SMARTDoc so that errors are not generated.

Next, sub-rule Application/ShellExecuteRule 111 has been added to ProcessScriptRule 110. Application/ShellExecuteRule 111 can be used to initiate execution of a third-party software application from inside the rule-set. For example, Application/ShellExecuteRule 111 could be used to start a particular Microsoft Word file for comparison purposes during the execution of the rule-set.

Sub-rule SendMailRule 112 has also been added to IncludeRule 109. Processing order for the elements described to this point would be: BaseRule 106, ComparePropertyRule 107, IncludeRule 109, ProcessScriptRule 110, ShellExecuteRule 111, SendMailRule 112. SendMailRule 112 can be used to send a plain-text electronic mail (email) message to a particular recipient or group of recipient before, during, or after rule processing. An example implementation of this rule might include invoking the SendMailRule to send an email message to the loan processing technician to let them know that the rule-set has been successfully processed.

Another sub-rule, AssignAgent 113 has been added to IncludeRule 109. AssignAgent rule 113 can be used to assign a particular individual to responsibility for the loan package. Combined with SendMailRule 112, AssignAgent rule 113 could be used to assign a particular individual to responsibility for the loan package, and inform them of that responsibility by email during processing.

Figure 4:
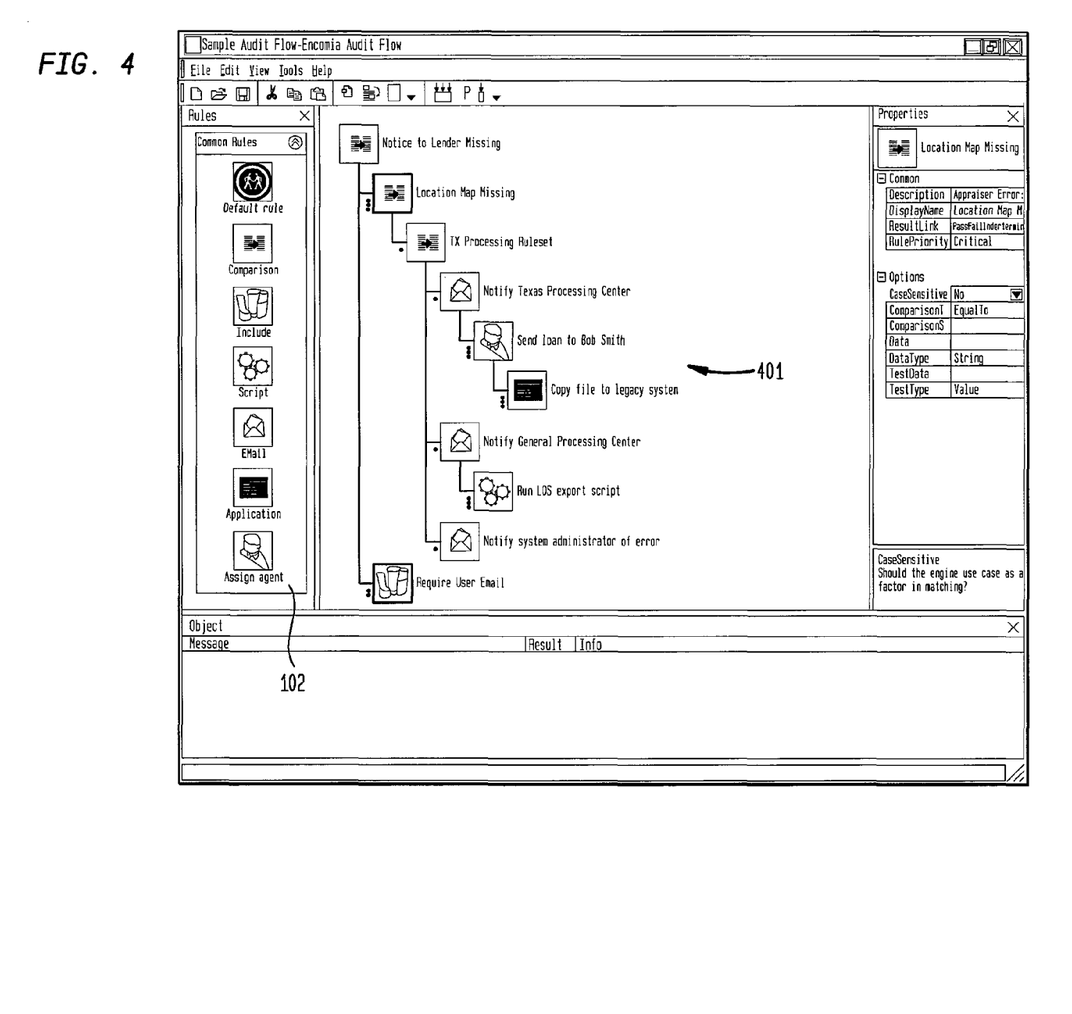
FIG. 4 is another representation of the program interface of the embodiment of the software program.

FIG. 4, shows another example of an audit rule set 401 using the rules from Rule pane 102. FIG. 4 illustrates the naming of the rules in rule set 401 to allow the user to see and understand the flow and associated descriptions. The icons for each rule in rule set 401 can be seen to correspond to the rules in rule pane 102, even though the individual rules in rule set 401 have been renamed to describe the process implemented in rule set 401. The Audit Rule Set can be saved as an Audit file (*.audf).

Auditing Documents

To audit a document, the user must create a new document or open an existing document in an editor, such as a SMARTDoc Editor application, to have a document against which to test the audit rule set. The SMARTDoc Editor is a WYSIWYG editor that allows for the creation and formatting of SMARTDocs and SMARTDoc templates. One mechanism used to create a new document would be to have the user start a document generation application, such as, for example, the New Document Wizard, which is a proprietary application sold by Encomia, Inc. The document generation application walks the user through the document creation process step-by-step.

From an end-user's perspective in the current embodiment, auditing a document is a simple process once the audit rules and rule-sets have been constructed. Audit rule-sets should be constructed first, using the Audit Flow Editor as described above, and a document or document template, such as a new SMARTDoc or SMARTDoc template, should be created with the editor, also as described above.

The concepts described herein are intended to be integrated with other software applications, such as, for example, the SMARTDoc Editor, or the New Document Wizard. Documents can be audited directly from these secondary software applications using custom menu items to invoke the integrated audit processing engine.

Figure 5:
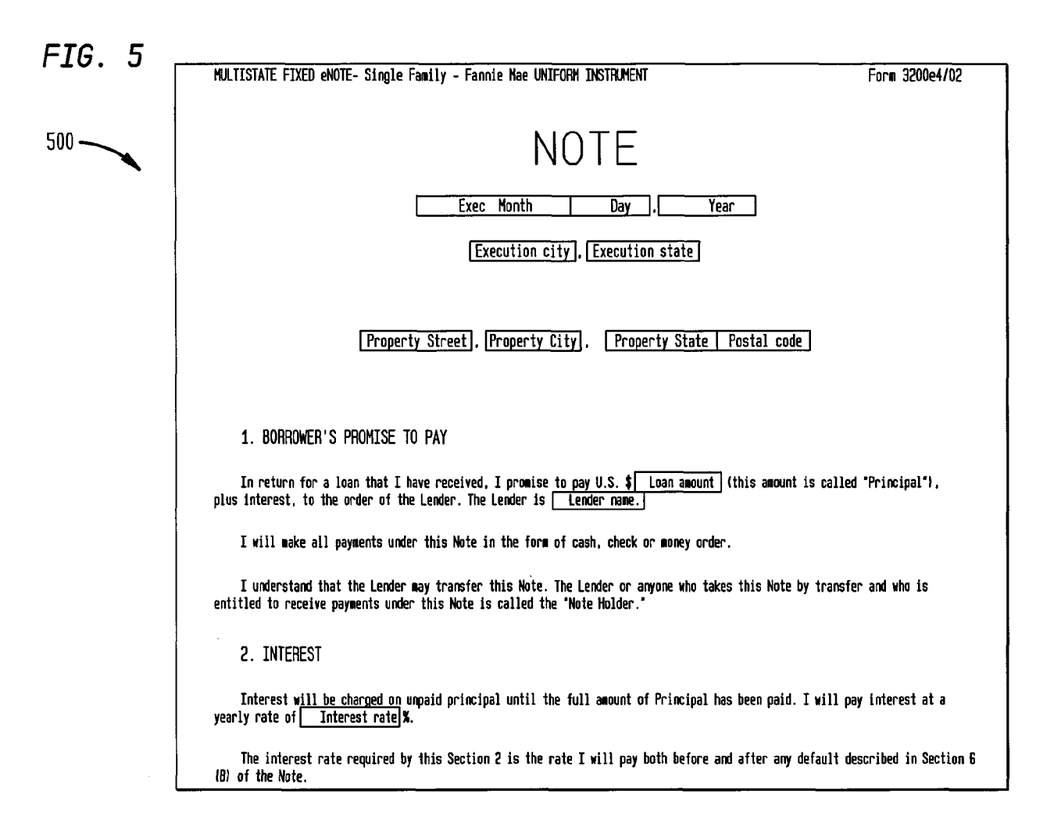
FIG. 5 is a representation of an embodiment of a SMARTDoc template according to the concepts described herein.

For illustrative purposes only, the SMARTDoc Editor is a WYSIWYG editor that can be used to develop SMARTDoc templates for mortgage and electronic mortgage applications. An example of an electronic document template, such as a SMARTDoc template, is shown in FIG. 5. An audit processing engine operable to audit a document or template using an audit rule set, such as is described with reference to FIGS. 1-4, is integrated with the editor, such as the SMARTDoc Editor, enabling the user to audit electronic document templates for legal and regulatory compliance from the editor. The audit processing engine can be embedded in the editor at the code level as an integrated processor, and would, in that embodiment, be available to the user from a standard menu item in the function menu bar.

As described, the user should have set up one or more audit rule-sets as described with respect to FIGS. 1-4, and can have created a new document with the editor, also as described above. The user can select the document to be audited and the audit file, containing one or more audit rule-sets, to use for auditing the document. Once a document or template and an audit rule-set has been selected the user can initiate the audit process.

Figure 6:
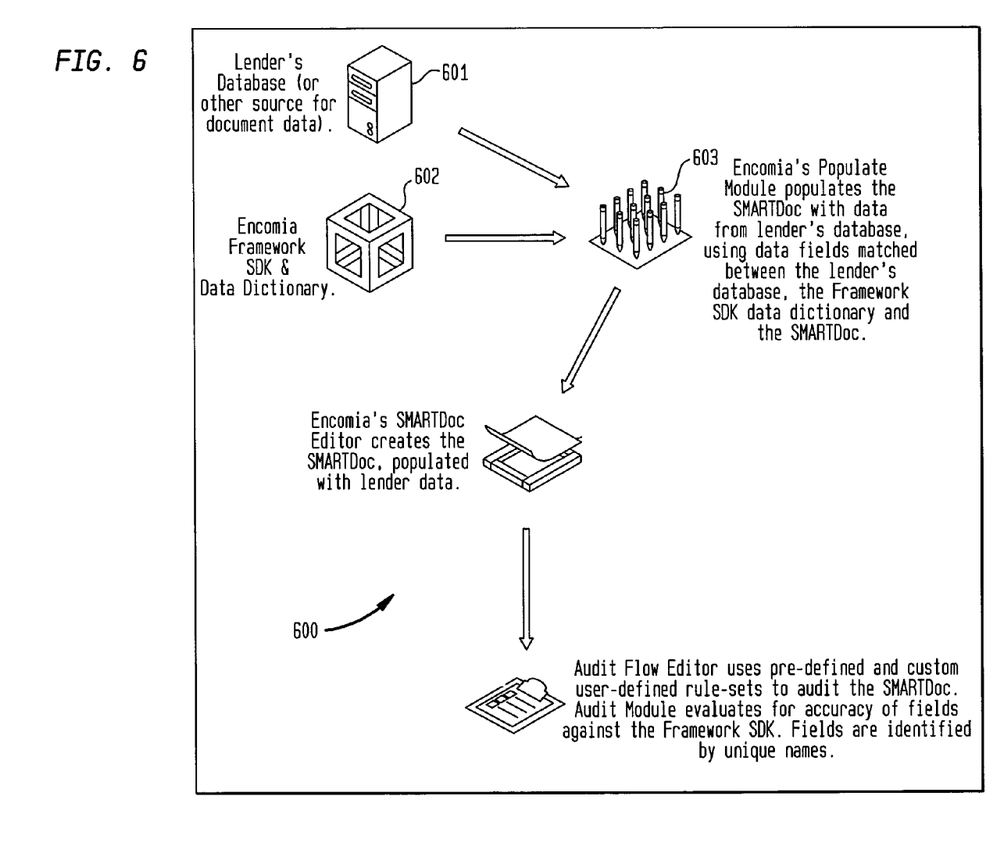
FIG. 6 is a workflow diagram illustrating an embodiment of the concepts described herein.

Referring now to FIG. 6, a simplified workflow illustration 600 is shown describing the steps in the process, in the embodiment of the current example, to create a document, populate it with variable data, and audit the document for legal and regulatory compliance.

Source data, such as variable loan-specific data can be obtained from a source, such as a lender, shown in FIG. 6 as lender's database 601. This source data is used to populate electronic documents, such as SMARTDocs, with application-specific data, for example, loan data, and may be tested against a program according to the concepts described herein, for regulatory and legal compliance.

Variable loan-specific source data may be obtained from the lender in any number of methods or formats. An example of this source data would be "Borrower Name" and "Borrower Phone Number." A lender might obtain this data directly from a loan application, or might obtain this data from a loan officer following an interview with a loan applicant. Regardless of method for obtaining the data, the data is entered into a Loan Origination System (LOS) by most lenders. There are many LOS in the mortgage market today, including (for example) Calyx Point, Genesis2000, and Byte, to name but a few.

Documents can further be populated with variable source data from a framework database and/or soft developer's kit, or SDK, shown as framework 602. For example, the user can use a Logical Data Dictionary (LDD), such as one supplied by Encomia, Inc., which is based on the MISMO LDD. As an example, the "Subject Property Address" definition can be taken from the XPATH for the Subject Property Address of the Encomia LDD (/SMART_DOCUMENT/DATA/MAIN/LOAN/_APPLICATION/PROPERTY/_StreetAddress). When a new document is populated with variable source data, a populate processing engine 603 examines the source data file for XPATHs, then examines the document and looks for corresponding XPATH data objects in the document. If the source data file contains an XPATH for "Subject Property Address" and corresponding data, the populate processing engine matches the XPATH in the source data file with the matching XPATH data object in the document and inserts the variable source data from the XPATH "Subject Property Address" field in the source data file into the corresponding data object placeholder in the document. Framework 602 also plays a role in this process, providing the "bridge" between the MISMO LDD and third party LDDs, acting as a sort of "translator" for data objects.

In FIG. 5, a sample document 500, shown as a SMARTDoc, representative of the type(s) of documents that would be used in the software application, is shown. Common source data for this document would include (but is not limited to) BorrowerName, PropertyAddress, PropertyCity, PropertyState, PropertyZipCode, BorrowerPhone, LoanAmount, InterestRate, LenderName, PaymentDate, and PaymentAddress. Common rules that would be used in auditing this document include (but are not limited to) BaseRule, Comparison, Include, and Script.

Figure 7:
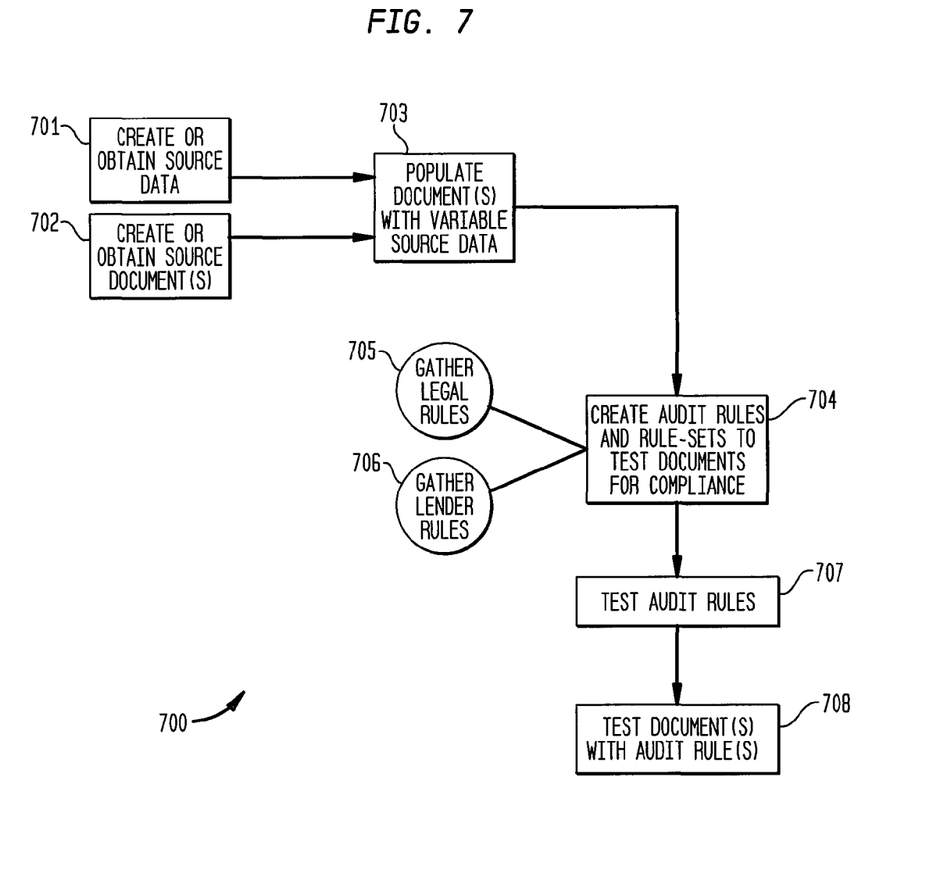
FIG. 7 is a flowchart illustrating an embodiment of a method for validating legal documents with audit rules according to the concepts described herein.

FIG. 7 is a flow chart of one embodiment of a method according to the concepts described herein to create a document and test the document with audit rules. Method 700 begins with processes 701 and 702, which create or obtain source data and/or create or obtain a corresponding document, respectively. The document from process 702 is then populated with source data, or variable data, in process 703. In process 704 audit rules are used to construct audit rule-sets which are used to test the documents for compliance with applicable rules and regulations. Process 704 uses processes 705 to gather applicable regulations and laws. Process 704 further uses process 706 to gather applicable provider, such as a lender, requirements and standards that are specific to the lender, and may be purely driven by the lender's internal requirements and procedures.

Process 707 takes the audit rule-set(s) and tests it to make sure that it is accurate. Lastly, process 708 takes the rule-set and tests the document from process 703 against that rule-set to make sure the document complies with the applicable legal and internal standards to ensure that the document is appropriately binding on the parties.

The concepts described herein are typically embodied as software programming code which may be stored in permanent storage of some type such as the permanent storage of the workstation. In a client server environment, however, such software programming code could be stored with the storage associated with a server such as storage associated with computer operating as a server. The software programming code embodying techniques according to the present invention can itself be implemented on any of a variety of known media for use with a data processing system such as a removable diskette, cassette tape, hard drive or CD ROM. The code may be distributed on such media or distributed to users from the memory or storage of one computer system over a communications network of any given type to other computer systems for use by users of such systems. The techniques and method of embodying software program code on physical media and for distributing or embodying the code via networks are well known and will not be further discussed herein.

In conclusion, the present invention provides for a method to determine and describe allowable and forbidden validation of data contained within a legal document describing regulatory structure as evinced by legal text. In the foregoing specification, the concepts have been described with reference to specific exemplary embodiments thereof. Many changes or modifications are readily envisioned. For example, different types of regulation may allow for multiple resolvable solutions all perfectly valid, among other changes, are included within other embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer implemented method for creating and verifying legally enforceable financial documents with variable source data and testing the documents for compliance with applicable rules, the method comprising:
    creating a financial document from a framework database by populating the financial document with static data and with the variable source data, the static data and the variable source data obtained from at least two distinct sources, wherein the financial document is a SMARTDoc;
    creating an audit rule-set in an audit flow interface using preconfigured audit rules, wherein creating the audit rule set includes gathering legal rules and provider requirements used to construct the preconfigured audit rules, the legal rules and provider requirements including rules to test against organization business rules, organization processing and approval rules and legal rules, and wherein the audit flow interface including a common rules pane showing common rules, each of the common rules capable of being used in the audit rule-set, the audit flow interface further comprising an editor pane where the audit rules and relationships between the audit rules are displayed and edited by a user, and a properties pane where properties of specific rules are displayed, wherein the common rules pane, the editor pane and the properties pane are simultaneously displayed to the user; and
    testing the document to verify compliance with legal and financial standards by using the audit rule-set to determine whether the document complies with the applicable rules.

2. The method of claim 1 further comprising creating the financial document before populating the document with the source data.

3. The method of claim 1 wherein the financial document is obtained from an existing source.

4. The method of claim 1 further comprising creating the source data before populating the financial document with the source data.

5. The method of claim 1 further comprising obtaining the source data from an existing source before populating the financial document with the source data.

6. The method of claim 1 wherein the audit rule-set includes parent-child dependencies.

7. The method of claim 1 wherein the audit rule-set is created by dragging and dropping the preconfigured audit rules from a rule pane into an editor pane.

8. The method of claim 1 wherein the audit rules that make up the audit rule-set include symbols indicating results appropriate to a particular audit rule.

9. The method of claim 1 wherein the audit rule-set is presented visually to a user in a hierarchical format showing the execution order of the audit rules forming the audit rule-set.

10. A computer implemented method for creating and verifying legally enforceable financial documents with variable source data and testing the financial documents for compliance with applicable rules, the method comprising:
    holding, in a rule pane, one or more preconfigured rules usable in auditing the financial documents from a framework database, wherein the financial documents are SMARTDoc documents;
    allowing a user to use a rule set editor to assemble audit rule-sets from the rules in the rule pane, the rule-set editor operable to create relationships between each rule in response to user commands;
    describing a rule displayed in the rules pane in a properties pane; and
    assembling the one or more preconfigured rules in the rule pane into an audit rule set in the rule set editor, by gathering legal rules and provider requirements used to construct the preconfigured rules, wherein the audit rule set includes rules to test against organization business rules, organization processing and approval rules and legal rules, and wherein the audit rule set used to verify compliance with legal and financial standards by testing the financial documents for compliance with applicable rules.

11. The method of claim 10 wherein the user drags and drops rules from the rules pane into the rule-set editor to assemble the audit rule-set.

12. The method of claim 10 wherein the properties pane includes both general information and rule specific information.

13. The method of claim 10 wherein the rules in the audit rule-set have associated symbols indicating expected results.

14. The method of claim 10 further comprising creating a document using document editor the document capable of being tested for compliance.

15. The method of claim 14 further comprising auditing the document using an audit processing engine operable to audit the document in the document editor against the audit rule-set.

16. The method of claim 15 wherein the audit processing engine is embedded in the document editor.

17. The method of claim 10 wherein the financial documents contain both static legal text and variable data specific to a legal contract.

18. The method of claim 17 wherein the financial documents are mortgage documents.

19. The method of claim 17 wherein the financial documents use extensible markup language.

* * * * *